July 9, 1940.  M. A. THORNE  2,207,362

VIBRATION SUPPRESSOR

Filed Oct. 3, 1938

Inventor
Maurice A. Thorne
By
Blackmore, Spencer & Flint
Attorneys

Patented July 9, 1940

2,207,362

UNITED STATES PATENT OFFICE 2,207,362

VIBRATION SUPPRESSOR

Maurice A. Thorne, East Lansing, Mich., assignor to General Motors Corporation, Detroit, Mich., a corporation of Delaware Application October 3, 1938, Serial No. 232,922

5 Claims. (Cl. 74—574)

This invention relates to vibration suppressing means for internal combustion engine shafts or the like.

An object is to improve harmonic vibration balancers or absorbers, facilitate production, reduce manufacturing costs and enlarge the utility of devices of this type.

The invention consists of a combination comprising an inertia body of sheet or plate metal spring-connected to one end of an engine crankshaft by improved means and having a periodicity that adapts it to counteract vibrations of the crankshaft, as more particularly described hereinafter and illustrated in the accompanying drawing.

Figure 1:
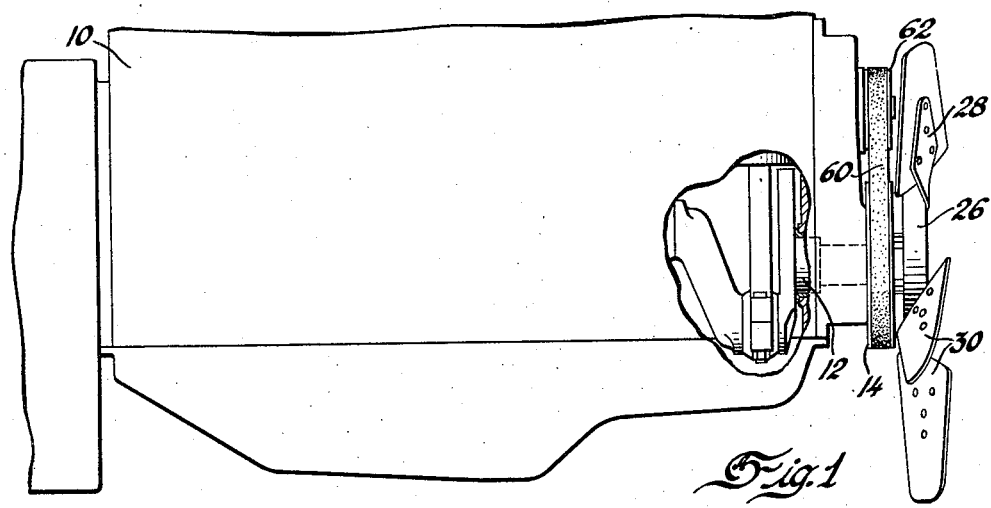
Figures 2, 3:
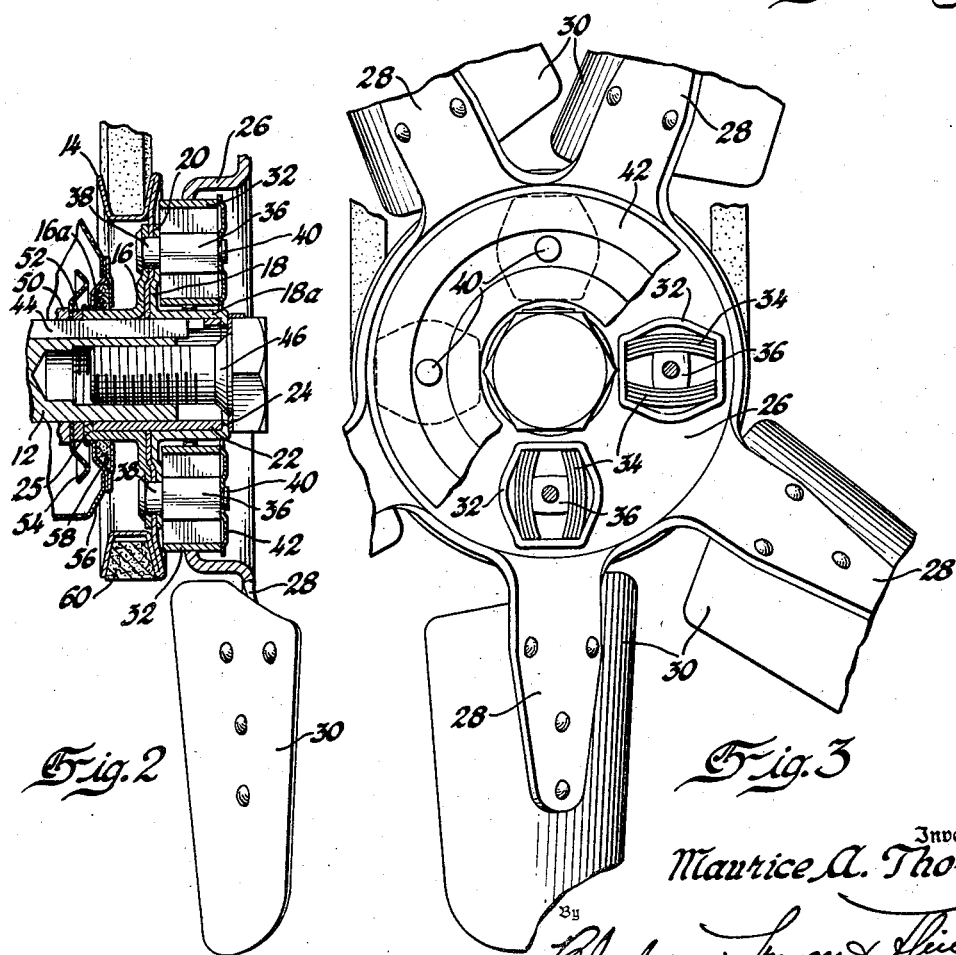

In said drawing Fig. 1 is a side elevation of an engine with parts broken away and in section to disclose the crankshaft and showing on the front end of the crankshaft a composite vibration suppressor and engine cooling fan; Fig. 2 is an axial section through a unitary assembly of generator-driving pulley, vibration suppressor and fan; Fig. 3 is a front elevation of the assembly shown in Fig. 2, a front cover plate having been broken away in part to reveal the structure behind it.

In Fig. 1 numeral 10 indicates an engine shown fragmentarily, the crankshaft 12 showing through the broken casing. The front end of shaft 12 extends forward of the engine block and casing and to this front end is keyed a composite structure of pulley, vibration suppressor and cooling fan. The pulley is indicated by numeral 14. It is shown to be of sheet metal construction having a web 20 clamped between the radial flanges of two annular supports 16 and 18 to which said web is riveted as hereinafter described. These supports are approximately right-angular in cross section having cylindrical hub portions 16a and 18a. The hub portions of the supporting members 16 and 18 are sleeved over a bushing 22 and are securely affixed to it by the turned-in ends 24 and 25 on said hub portions or by any suitable means.

The fan is composed of a ring-like fan body or blade carrier 26 of sheet or plate metal having radiating arms 28 to which are riveted fan blades 30 as shown in Figs. 2 and 3. The central part of body or carrier 26 is of dish-like form so that the arms 28 and fan blades which project from the rim are carried somewhat forward of the plane of the central part of the body in order to avoid interference with other parts of the mechanism. The fan body 26 is provided with a plurality of eccentrically disposed openings equally spaced and at equal distances from the center. The outer and inner sides of these openings are parallel and extend along chords of the circle formed by the rim of the fan body. The other two sides are curved away from each other forming concave interior surfaces. Into these openings are secured as by brazing, welding or otherwise tubular spring housings 32 of forms corresponding to the openings. The two internal corners of a spring housing on one side of a radius that passes midway between the curved sides form spring abutments for the ends of one bank of springs 34 and the opposite corners form spring abutments for the ends of another bank of springs. The springs are flat pieces of spring steel, several being assembled to constitute a composite leaf spring. Between the two banks of springs in each housing and stressing the springs pass pins 36 extending parallel to the axis of shaft 12 as shown in Fig. 2. The rearward or inner ends of these pins are reduced at 38 and pass through holes in the flanged pulley supports 16 and 18 and in the web 20 of the pulley, and are riveted so as to firmly secure together the pulley and its supports and the pin 36. The forward or outer ends of pins 36 are also reduced and riveted as at 40 to an annular cover plate 42 which covers all of the front end of the spring housings 32. The flanges of supports 16 and 18 and pulley 14 cover the rearward or inner ends of said housings.

The assembly of pulley, vibration suppressor and fan is shown keyed to the front end of the shaft as by the key 44. The assembly is secured to the front end of the crankshaft so as to prevent axial movement by a bolt 46 threaded into the end of the crankshaft and having a head and washer bearing upon the front end of the assembly and holding it securely in place. Numeral 50 indicates the hub of the engine timing gear, 52 a washer between which and the timing gear the oil slinger 54 is clamped when the bolt 46 is tightened. Numeral 56 indicates part of a housing and carries a packing 58 to impede the passage of oil from within the housing toward the pulley, vibration suppressor and fan assembly. Pulley 14 drives a belt 60 which in turn transmits rotation to a pulley 62 for operating the generator.

The bushing 22, pulley supports 16, 18, pulley 14, pins 36, springs 34, cover plate 42, fan body and fan are assembled as a unitary piece of mechanism and affixed as a unit on the end of a crankshaft.

In the construction disclosed herein the pulley, pulley supports and pins 36 partake of all movements of the crankshaft. The fan body 26, with spring-housings 32, arms 28 and fan blades 30, constitute the inertia body spring-connected to the pins 36 and tuned to counteract vibrations of the engine shaft.

I claim:

1. The combination of a shaft, supporting means fixed to the shaft and extending radially outward therefrom, pins rigid with the supporting means and extending substantially parallel with the shaft axis, an inertia body of sheet metal surrounding the shaft and having eccentrically disposed openings therethrough, said body comprising a tubular spring housing secured in each opening intermediate the ends of the housing, said housing having spring abutments therein, and opposed springs having bearing on the abutments and on said pins.

2. A combination as defined in claim 1 in which the springs are leaf springs and the abutments within the tubular housing are arranged to bear against the ends of the springs and the pins bear against the springs intermediate their ends and stress them.

3. A combination as defined in claim 1 in which the supporting means forms a continuous cover for the rear ends of the spring housings and a continuous cover for the front ends of the spring housings is secured to the forward ends of said pins.

4. A combination as defined in claim 1 in which the inertia body comprises a dished sheet metal body having its rim extending forward with integral parts thereof turned radially outward from the front of the rim.

5. The combination of a bushing adapted to be keyed to a shaft, a pair of annular flanged supporting members provided with hubs surrounding the bushing and secured thereto, a sheet metal pulley having a web disposed between the flanges of the supporting members, pins having their inner ends riveted to said flanges and web projecting parallel with one of said hubs, a sheet metal inertia body concentric with the last named hub, said inertia body having tubular housings registering with the pins and extending on both sides of said body, opposed springs bearing on opposed walls of said housings and on opposite sides of said pins, and an annular cover plate riveted to the outer ends of said pins and covering the outer ends of said tubular housings.

MAURICE A. THORNE.